(12) United States Patent
Tsunoda

(10) Patent No.: US 11,418,419 B2
(45) Date of Patent: Aug. 16, 2022

(54) MONITORING SYSTEM

(71) Applicant: TOSHIBA TEC KABUSHIKI KAISHA, Tokyo (JP)

(72) Inventor: Youji Tsunoda, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 16/687,851

(22) Filed: Nov. 19, 2019

(65) Prior Publication Data
US 2020/0313990 A1 Oct. 1, 2020

(30) Foreign Application Priority Data

Mar. 26, 2019 (JP) .............................. JP2019-059202

(51) Int. Cl.
| | |
|---|---|
| *H04L 43/0817* | (2022.01) |
| *G08B 5/38* | (2006.01) |
| *H04L 43/065* | (2022.01) |
| *G06F 11/32* | (2006.01) |

(52) U.S. Cl.
CPC .......... *H04L 43/0817* (2013.01); *G06F 11/32* (2013.01); *G08B 5/38* (2013.01); *H04L 43/065* (2013.01)

(58) Field of Classification Search
CPC . H04L 43/0817; H04L 43/065; H04L 1/0003; G06F 11/32; G08B 5/38
See application file for complete search history.

(56) References Cited

U.S. PATENT DOCUMENTS

| | | | |
|---|---|---|---|
| 6,347,137 B1 | 2/2002 | Mason | |
| 6,824,065 B2* | 11/2004 | Boone | G07C 1/10 |
| | | | 235/382 |
| 10,746,866 B2* | 8/2020 | Alkhabbaz | G01F 23/0069 |
| 10,885,542 B2* | 1/2021 | Panigrahi | G06F 16/436 |
| 11,074,567 B2* | 7/2021 | Vick | G06Q 20/3224 |
| 2005/0052686 A1* | 3/2005 | Maruyama | H04N 1/00633 |
| | | | 358/1.15 |
| 2012/0203647 A1 | 8/2012 | Smith | |
| 2016/0005309 A1 | 1/2016 | Aoyama et al. | |
| 2017/0249616 A1 | 8/2017 | Gotanda et al. | |

OTHER PUBLICATIONS

Extended European Search Report for European Patent Application No. 20150998.1 dated Aug. 5, 2020.

\* cited by examiner

*Primary Examiner* — Chandrahas B Patel
(74) *Attorney, Agent, or Firm* — Amin, Turocy & Watson, LLP

(57) ABSTRACT

According to one embodiment, a monitoring system includes an information processing device and a server, in which the information processing device includes an information transmission unit that transmits information related to operation log information to the server when the operation log information of the information processing device is detected, and the server includes a reception unit that receives the operation log information transmitted by the information transmission unit, a first operation modulation unit that generates frequency information indicating an operation of the information processing device based on the operation log information received by the reception unit, and a lighting control unit that blinks a lighting light source provided in a store to illuminate the store based on the frequency information generated by the first operation modulation unit.

18 Claims, 10 Drawing Sheets

FIG. 3

| ITEM SECTION | ACTUAL DATA SECTION | FIRST THRESHOLD SECTION | SECOND THRESHOLD SECTION |
|---|---|---|---|
| SSD USE COUNT | COUNT UNIT | FIRST THRESHOLD COUNT | SECOND THRESHOLD COUNT |
| NUMBER OF LINES PRINTED BY PRINTER | NUMBER OF PRINTED LINES | FIRST THRESHOLD NUMBER OF LINES | SECOND THRESHOLD NUMBER OF LINES |
| ⋮ | ⋮ | ⋮ | ⋮ |

MONITORING SYSTEM

CROSS-REFERENCE TO RELATED APPLICATION

This application is based upon and claims the benefit of priority from Japanese Patent Application No. 2019-059202, filed in Mar. 26, 2019, the entire contents of which are incorporated herein by reference.

FIELD

Embodiments described herein relate generally to a monitoring system.

BACKGROUND

In the related art, abnormality information related to the lifetime of each part of a point of sales (POS) terminal installed in a store or abnormal operation is managed by a server connected to the POS terminal. The POS terminal transmits the own abnormality information thereof to the server via a network. For this reason, when a maintenance person who maintains POS terminals visits a store, it is necessary to check the information displayed on the server installed in the backyard to check the abnormality information of each POS terminal. Therefore, it takes significant and inconvenient time for the maintenance person to check the abnormality information of each POS terminal.

DESCRIPTION OF THE DRAWINGS

FIG. 3 is a diagram showing information stored in an abnormality information section;

DETAILED DESCRIPTION

Embodiments provide a monitoring system in which the maintenance person can obtain operation information of an information processing device without having to spend time in a store.

In general, according to one embodiment, a monitoring system includes an information processing device and a server, in which the information processing device includes an information transmission unit that transmits information related to operation log information to the server when the operation log information of the information processing device is detected, and the server includes a reception unit that receives the operation log information transmitted by the information transmission unit, a first operation modulation unit that generates frequency information indicating an operation of the information processing device based on the operation log information received by the reception unit, and a lighting control unit that blinks a lighting light source provided in a store to illuminate the store based on the frequency information generated by the first operation modulation unit.

Hereinafter, an abnormality monitoring system according to a first embodiment and a second embodiment will be described with reference to drawings. In the first embodiment and the second embodiment, a POS terminal will be described as an example of an information processing device. The exemplary embodiment is not limited to the embodiments described below.

First Embodiment

Figure 1:
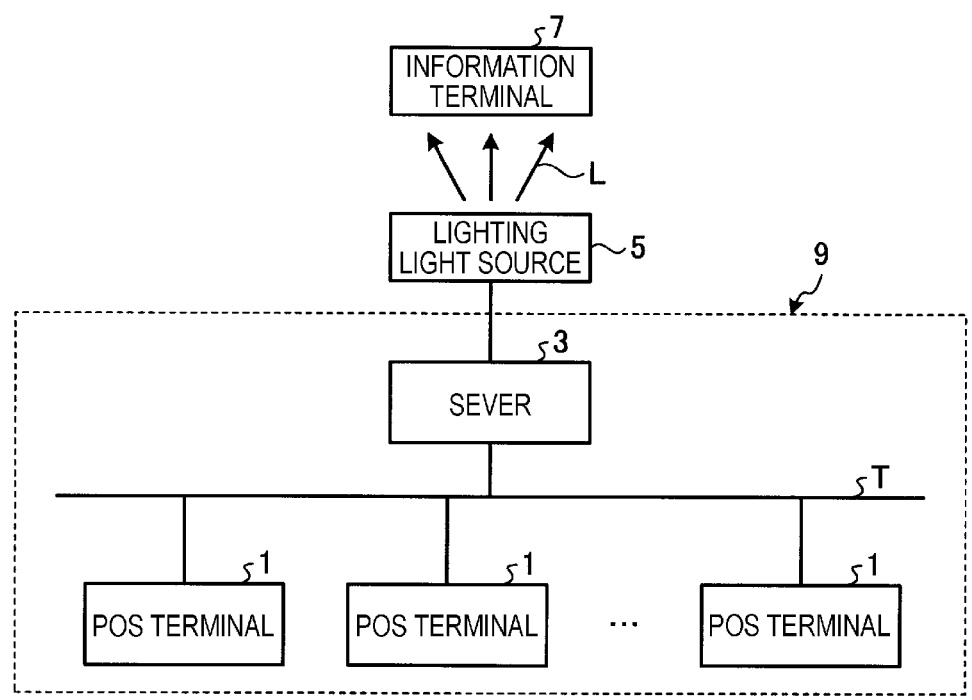
FIG. 1 is a diagram showing an abnormality monitoring system according to a first embodiment.

FIG. 1 is a diagram showing an abnormality monitoring system according to a first embodiment. As shown in FIG. 1, an abnormality monitoring system 9 includes a plurality of POS terminals 1 and one server 3. Further, in FIG. 1, a lighting light source 5 is provided in addition to the abnormality monitoring system. Each POS terminal 1 and server 3 are connected to each other via a network T such as a local area network (LAN).

First, the POS terminal 1 will be described. One or a plurality of POS terminals 1 are installed in a checkout section in a store. The POS terminal 1 is used for selling commodities displayed in the store. The POS terminal 1 includes a self-type POS terminal operated by a customer. The POS terminal 1 includes a semi-self type POS terminal in which a clerk operates sales registration and a customer performs accounting operations. The POS terminal 1 acquires commodity information of a commodity purchased by a customer to execute sales registration processing related to the commodity. Further, the POS terminal 1 executes settlement processing based on a settlement operation.

Here, the sales registration processing refers to processing of reading commodity information (commodity name, price, and the like) of a commodity, displaying the commodity information of the read commodity, and storing the commodity information in a commodity information section 131 (see FIG. 2) based on commodity code that identifies the commodity acquired by the POS terminal 1 based on the symbol or wireless tag attached to the commodity. The settlement processing refers to processing for displaying the total amount and tax amount related to transactions based on the commodity information stored in the commodity information section 131 with the sales registration processing, calculating and displaying changes based on deposits received from customers, and issuing receipts printed with commodity information and settlement information (total amount, deposit amount, change amount, and the like) by driving a printer 24 (see FIG. 2).

The POS terminal 1 monitors whether an abnormality occurred in the own device during the period from when the power is turned on to when the power is turned off. Further, the POS terminal 1 transmits abnormality information, which is operation log information indicating an abnormality occurring in the own device, to the server 3. In addition, the POS terminal 1 modulates the frequency of a lighting light source (LED) as a backlight that is provided on a display unit of the own device to brightly illuminate the display unit and outputs the modulated abnormality information from the display unit.

The server 3 collects commodity information and settlement information related to the commodities sold at each POS terminal 1 and manages the sales of the store. The server 3 receives abnormality information from each POS terminal 1. The server 3 also controls a lighting light source (for example, light emitting diode (LED) lighting) that illuminates the interior of the store. For example, a plurality of lighting light sources are installed in a store on the ceiling of the store and brightly illuminate the entrance and exit of the store, a display section on which commodities are displayed, a checkout section, and the like from above.

The LED can particularly increase the modulation frequency among the lighting light sources. Therefore, when using an LED as a lighting light source, the lighting light source can be used as lighting in the store, and at the same time, can modulate the intensity in a high-frequency band that does not cause flickering to the eyes of people in the store. When the lighting light source of which intensity is modulated in this way emits light L into the store to illuminate the store brightly, and the lighting light source of which intensity is modulated in this way is imaged by a camera provided in an information terminal 7 such as a smartphone, for example, the light L emitted from the lighting light source is received. The information terminal 7 that received the light L analyzes the modulated abnormality information included in the light L and displays the analyzed abnormality information on the display unit. By doing in this way, for example, a maintenance person who came to the maintenance inspection of the POS terminal 1 enters the store and images the lighting light source with the camera of the information terminal 7 to specify the POS terminal 1 where an abnormality occurred. In addition, the maintenance person can recognize when and what kind of abnormality occurred in the POS terminal 1. For this reason, the maintenance person can recognize the POS terminal 1 in which an abnormality occurred without checking the abnormality information of the POS terminal 1 in the server 3.

The server 3 outputs a signal for modulating the frequency of the lighting light source based on the abnormality information received from the POS terminal 1. The abnormality information of the POS terminal 1 to be included in the modulation frequency contains, for example, store information for specifying a store, a terminal number for specifying the POS terminal 1, the date and time when an abnormality occurred, an item for specifying the type of abnormality, actual data, and the like. In addition, the abnormality information contains information indicating whether the actual data is reached or exceeded a preset first threshold (threshold set as a near limit value that is not yet an abnormality value but approached the abnormality value) or whether the actual data reached or exceeded a preset second threshold (threshold set as a limit value that reached the abnormality value).

Figure 2:
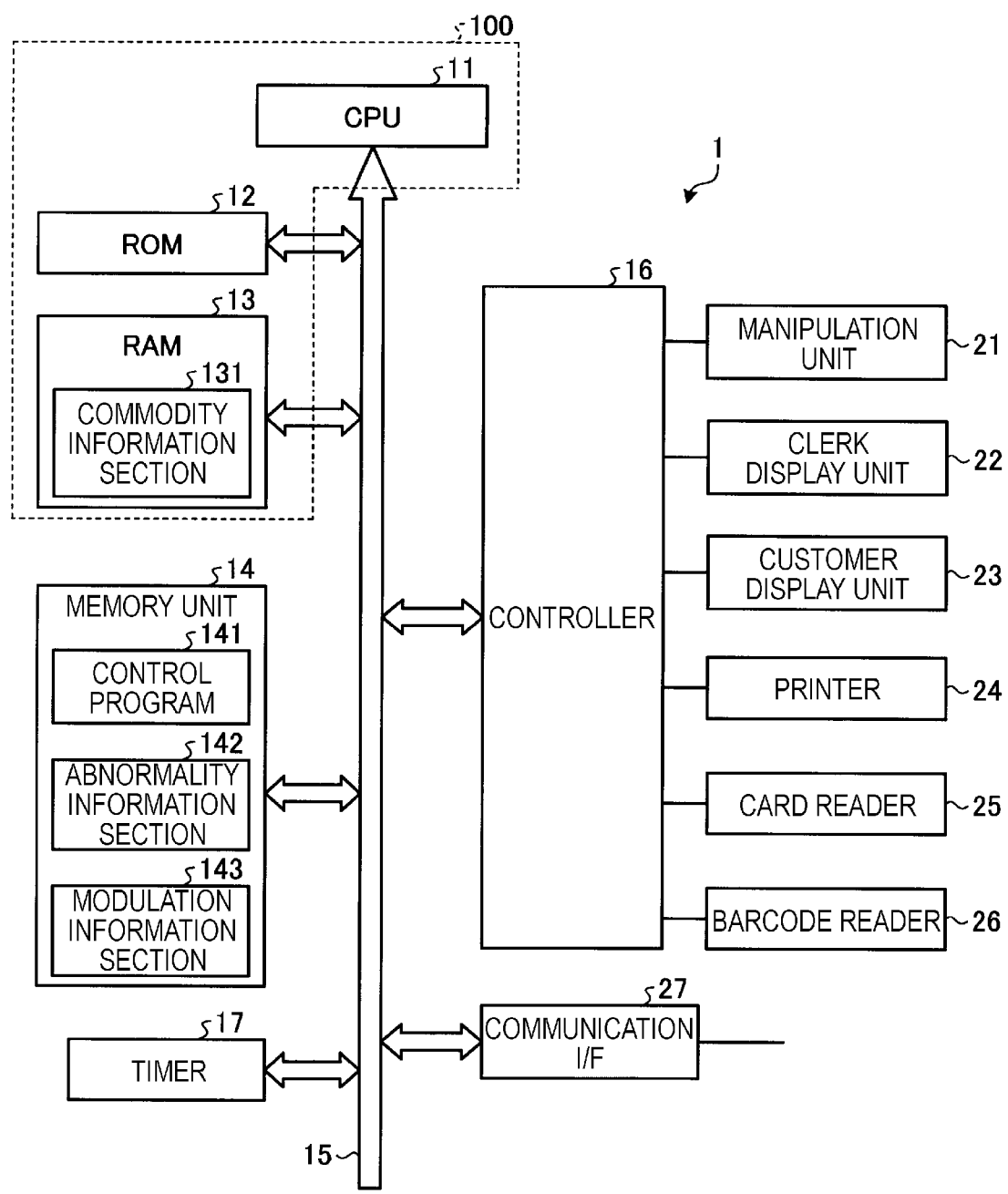
FIG. 2 is a block diagram showing a hardware configuration of a POS terminal.

From here, the hardware of the POS terminal 1 will be described. FIG. 2 is a block diagram showing a hardware configuration of the POS terminal 1. As shown in FIG. 2, the POS terminal 1 includes a central processing unit (CPU) 11, a read only memory (ROM) 12, a random-access memory (RAM) 13, a memory unit 14, and the like. The CPU 11 is a control subject. The ROM 12 stores various programs. The RAM 13 develops programs and various data. The memory unit 14 stores various programs. The CPU 11, the ROM 12, the RAM 13, and the memory unit 14 are connected to each other via a bus 15. The CPU 11, the ROM 12, and the RAM 13 constitute a control unit 100. That is, the control unit 100 executes control processing of the POS terminal 1 described later by the CPU 11 operating according to the control program stored in the ROM 12 or the memory unit 14 and developed in the RAM 13.

The RAM 13 includes a commodity information section 131. The commodity information section 131 stores commodity information (commodity name, commodity price, and the like) of the commodity that underwent sales registration processing.

The memory unit 14 is configured with a solid state drive (SDD), a hard disc drive (HDD), a flash memory, or the like and maintains the stored contents even when the power is shut off. The memory unit 14 includes a control program section 141, an abnormality information section 142, and a modulation information section 143. The control program section 141 stores a control program for controlling the POS terminal 1. The abnormality information section 142 stores abnormality information related to the abnormality of the POS terminal 1. The abnormality information section 142 will be described later with reference to FIG. 3. The modulation information section 143 stores conversion information for modulating abnormality information. In the first embodiment, description will be made assuming that the memory unit 14 is an SSD.

The control unit 100 includes a manipulation unit 21, a clerk display unit 22, a customer display unit 23, a printer 24, a card reader 25, and a barcode reader 26 via the bus 15 and a controller 16. The manipulation unit 21 includes a numeric keypad and function keys and is a keyboard for operation by a clerk or a customer. The clerk display unit 22 displays commodity information and settlement information to the clerk. The clerk display unit 22 modulates a light source (for example, LED) as a backlight that illuminates a screen displaying commodity information and settlement information at high speed and outputs the modulated abnormality information in the POS terminal 1 from the screen. The customer display unit 23 displays commodity information and settlement information to the customer. The printer 24 uses, for example, a thermal head provided with a heating element, prints commodity information and settlement information on a long thermal paper, and issues a receipt. The card reader 25 reads customer information from a card (for example, a credit card) used for settlement processing. The barcode reader 26 reads a symbol such as a barcode attached to the commodity.

In addition, the control unit 100 is connected to a communication I/F 27 and a timer 17 via the bus 15. The communication I/F 27 can exchange information with the server 3 via the network T. The timer 17 measures the current date and time.

From here, the abnormality information section 142 will be described. FIG. 3 is a diagram showing information stored in the abnormality information section 142. As shown in FIG. 3, the abnormality information section 142 includes an item section 1421, an actual data section 1422, a first threshold section 1423, and a second threshold section 1424. The item section 1421 stores an item that is abnormal. The actual data section 1422 stores actual data monitored for the item. The control unit 100 stores new actual data every time the actual data is updated. The first threshold section 1423 stores the first threshold that did not reach an abnormality value but approached the abnormality value. The second threshold section 1424 stores the second threshold that is the abnormality value.

In FIG. 3, two types of abnormality items are stored as an example. An abnormality 142a is an abnormality relating to the number of times that information is stored in SSD. In the abnormality 142a, the item section 1421 stores an item representing "SSD use count". The actual data section 1422 accumulates and stores the number of times that information was stored in the SSD so far. The number of times that information is stored in the SSD has an upper limit, and the abnormality value is reached when the upper limit is reached or exceeded. Every time information is stored in the SSD, the control unit 100 updates and stores the number of times that information is stored in the SSD stored in the actual data section 1422. When the information is stored in the SSD the number of times equal to or greater than the abnormality value, the control unit 100 determines that an abnormality occurred. The first threshold section 1423 stores the number of times that information is stored in the SSD that is smaller than the upper limit value but is very close to the upper limit value as the first threshold. The second threshold section 1424 stores the number of times the upper limit value is stored as an abnormality value.

An abnormality 142b is an abnormality relating to the number of lines printed on the receipt paper of the printer 24. As the printer 24 prints characters on the paper, the thermal head gradually wears, and there is a risk that the heating element will eventually break. Therefore, the number of lines printed on the receipt paper by the printer 24 is monitored, and it is determined whether an abnormality value that may cause break of the heating element was reached or exceeded if printing is performed more than this. The item section 1421 in the abnormality 142b stores an item representing "number of printed lines". The actual data portion 1422 accumulates and stores the number of lines printed by the printer 24 so far. The control unit 100 updates the number of print lines stored in the actual data section 1422 every time one line is printed on the paper by the printer 24. The first threshold section 1423 stores the number of times that the number of printed lines of the printer 24 is smaller than the abnormality value but is very close to the abnormality value as the first threshold. The second threshold section 1424 stores the number of printed lines that is the abnormality value.

The control unit 100 determines, for each item, whether the actual data stored in the actual data section 1422 reached or exceeded the first threshold stored in the first threshold section 1423. If it is determined that the first threshold was reached or exceeded, the control unit 100 outputs message information (for example, a message such as "It is almost time to replace the thermal head.") indicating that the first threshold was reached or exceeded. In addition, if it is determined that the second threshold was reached or exceeded, the control unit 100 outputs message information (for example, a message such as "It is time to replace the thermal head. Please replace it.") indicating that the second threshold was reached or exceeded.

Figure 4:
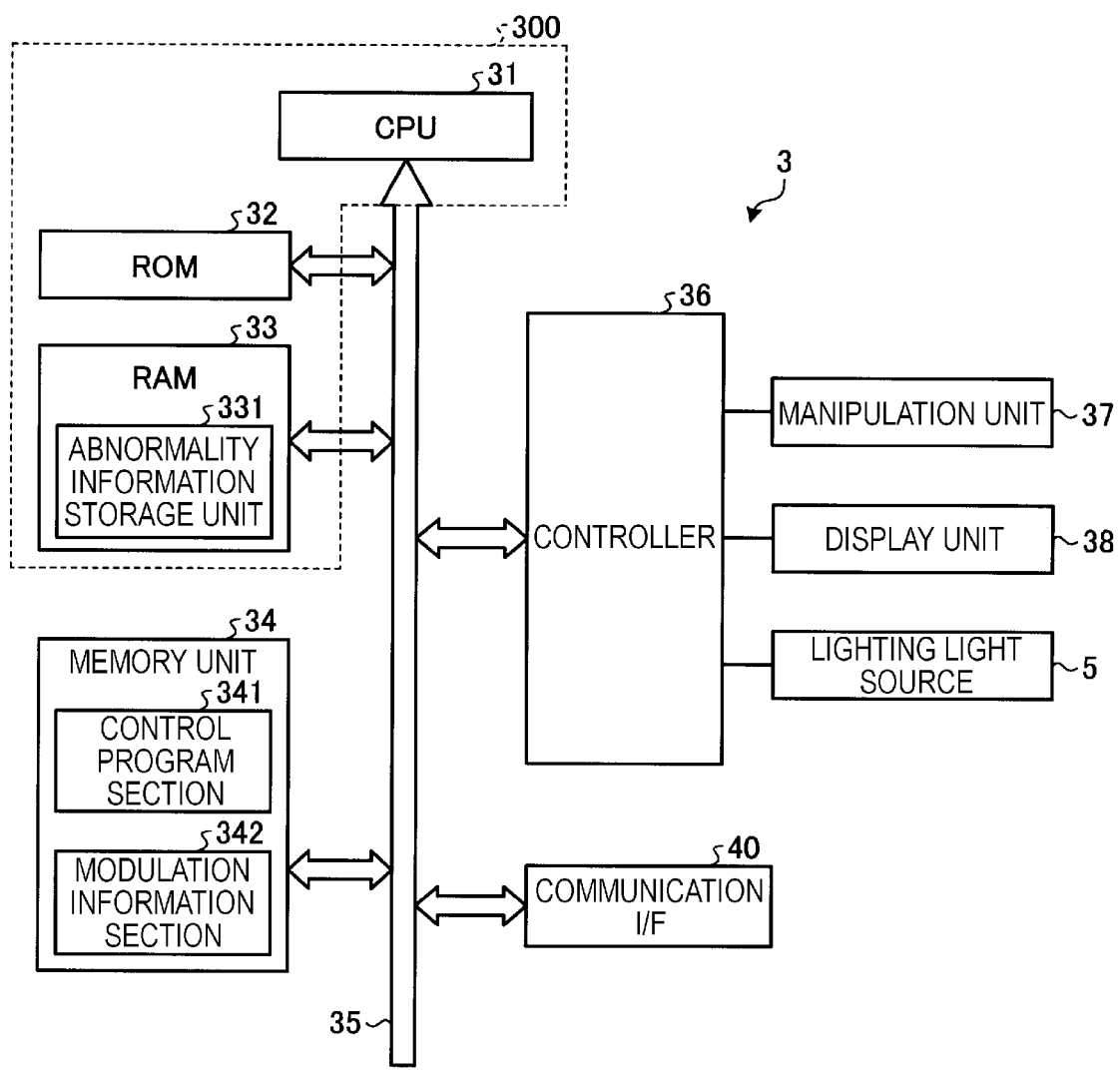
FIG. 4 is a block diagram showing a hardware configuration of a server.

From here, the hardware configuration of the server 3 will be described. FIG. 4 is a block diagram showing a hardware configuration of the server 3. As shown in FIG. 4, the server 3 includes a CPU 31, a ROM 32, a RAM 33, a memory unit 34, and the like. The CPU 31 is a control entity. The ROM 32 stores various programs. The RAM 33 develops programs and various data. The memory unit 34 stores various programs. The CPU 31, the ROM 32, the RAM 33, and the memory unit 34 are connected to each other via a bus 35. The CPU 31, the ROM 32, and the RAM 33 constitute a control unit 300. That is, the control unit 300 executes control processing of the server 3 described later by the CPU 31 operating according to the control program stored in the ROM 32 or the memory unit 34 and developed in the RAM 33.

The RAM 33 includes an abnormality information storage unit 331. The abnormality information storage unit 331 stores abnormality information for each POS terminal 1 received from the POS terminal 1.

The memory unit 34 is configured with an SSD, an HDD, a flash memory, and the like and maintains the stored contents even when the power is shut off. The memory unit 34 includes a control program section 341 and a modulation information section 342. The control program section 341 stores a control program for controlling the server 3. The modulation information section 342 stores conversion information for modulating abnormality information.

The control unit 300 includes a manipulation unit 37, a display unit 38, and the lighting light source 5 via the bus 35 and a controller 36. The manipulation unit 37 is a keyboard including numeric keys and function keys. The display unit 38 displays information to an operator of the server 3. The lighting light source 5 is a lighting device including a power supply unit and a control unit. When the lighting light source 5 receives the modulated abnormality information output from the server 3, the lighting light source 5 blinks the LED at a modulated frequency at high speed.

In addition, the control unit 300 is connected to a communication I/F 40 via the bus 35. The communication I/F 40 can exchange information with the POS terminal 1 via the network T.

Figure 5:
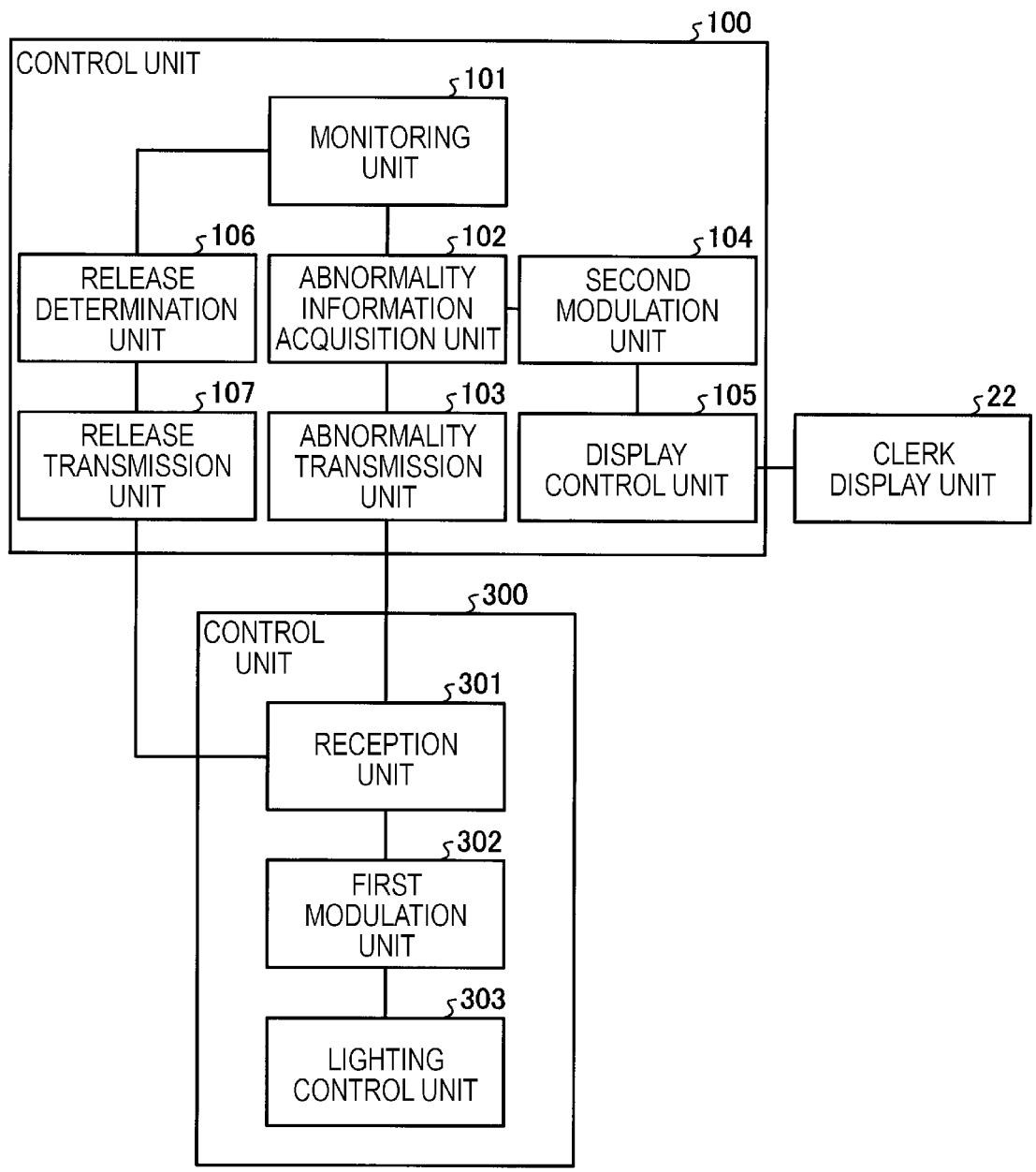
FIG. 5 is a functional block diagram showing a functional configuration of the abnormality monitoring system.

From here, the functional configuration of the abnormality monitoring system 9 will be described. FIG. 5 is a functional block diagram showing a functional configuration of the abnormality monitoring system 9. The POS terminal 1 in the abnormality monitoring system 9 functions as a monitoring unit 101, an abnormality information acquisition unit 102, an abnormality transmission unit (information transmission unit) 103, a second modulation unit 104, a display control unit 105, a release determination unit 106, and a release transmission unit 107 by following the control program stored in the control program section 141 and developed in the RAM 13. In addition, the server 3 in the abnormality monitoring system 9 functions as a reception unit 301, a first modulation unit 302, and a lighting control unit 303 by following the control program stored in the control program section 341 and developed in the RAM 33.

The monitoring unit 101 monitors whether there is an abnormality in the own POS terminal 1. Specifically, the monitoring unit 101 monitors whether there is an abnormality in the own POS terminal 1 from when the own POS terminal 1 is turned on until the power is turned off.

The abnormality information acquisition unit 102 acquires abnormality information of a portion that is abnormal as a result of monitoring by the monitoring unit 101. Specifically, when the monitoring unit 101 monitored that the actual data reached or exceeded the first threshold for the abnormality 142a and abnormality 142b in the abnormality information section 142, the abnormality information acquisition unit 102 recognizes that there is an abnormality and acquires abnormality information. In the case of the abnormality 142a, the abnormality information acquisition unit 102 acquires store information that identifies the store, the terminal number of the POS terminal 1, the date and time when an abnormality occurred, an item (information that indicates the number of times that SSD is used) that identifies the type of abnormality, the number of times that information is stored in SSD as actual data that reached or exceeded the first threshold, message information indicating that the number of times that information is stored reached or exceeded the first threshold, as abnormality information. In the case of the abnormality 142b, the abnormality information acquisition unit 102 acquires store information that identifies the store, the terminal number of the POS terminal 1, the date and time when the abnormality occurred, an item that identifies the type of abnormality (the number of lines printed by the printer 24), the number of lines printed by the printer 24 as actual data that reached or exceeded the first threshold, message information indicating that the number of printed lines reached or exceeded the first threshold, and the like, as abnormality information.

In addition, the abnormality information acquisition unit 102 acquires abnormality information when the actual data being monitored reaches or exceeds the second threshold. In the case of the abnormality 142a, the abnormality information acquisition unit 102 acquires store information that identifies the store, the terminal number of the POS terminal 1, the date and time when an abnormality occurred, an item (information that indicates the number of times that SSD is used) that identifies the type of abnormality, the number of times that information is stored in SSD as actual data that reached or exceeded the second threshold, message information indicating that the number of times that information is stored reached or exceeded the second threshold, as abnormality information. In addition, in the case of the abnormality 142b, the abnormality information acquisition unit 102 acquires store information that identifies the store, the terminal number of the POS terminal 1, the date and time when the abnormality occurred, an item that identifies the type of abnormality (the number of lines printed by the printer 24), the number of lines printed by the printer 24 as actual data that reached or exceeded the second threshold, message information indicating that the number of printed lines reached or exceeded the second threshold, and the like as abnormality information.

When the abnormality transmission unit (information transmission unit) 103 detects an abnormality of the own POS terminal 1, the abnormality transmission unit transmits abnormality information related to the abnormality to the server 3. Specifically, the abnormality transmission unit 103 transmits the abnormality information to the server 3 when the abnormality information acquisition unit 102 acquires the abnormality information.

The second modulation unit 104 generates frequency information indicating the abnormality based on the abnormality information. Specifically, the second modulation unit 104 generates frequency information including abnormality information indicating the abnormality in a high-frequency band that does not cause flickering to the eyes of people for the abnormality information acquired by the abnormality information acquisition unit 102, based on the conversion information stored in the modulation information section 143.

Based on the frequency information generated by the second modulation unit 104, the display control unit 105 blinks and displays the information of the clerk display unit 22. Specifically, the display control unit 105 blinks the backlight of the clerk display unit 22 configured with the LED based on the frequency information generated by the second modulation unit 104.

The release determination unit 106 determines whether the abnormality was released when the monitoring unit 101 monitors that the abnormality was released in the POS terminal 1.

The release transmission unit 107 transmits the abnormality release to the server 3 when the abnormality is released. Specifically, the release transmission unit 107 transmits abnormality release information indicating abnormality release to the server 3 for the item determined to be released by the release determination unit 106.

The reception unit 301 accepts reception of abnormality information indicating an abnormality that occurred in the POS terminal 1. Specifically, the reception unit 301 receives the abnormality information transmitted by the abnormality transmission unit 103 and stores the abnormality information in the abnormality information storage unit 331, thereby accepting the reception of the abnormality information. In addition, the reception unit 301 receives the abnormality release information transmitted by the release transmission unit 107.

The first modulation unit 302 generates frequency information indicating the abnormality based on the abnormality information received by the reception unit 301. Specifically, the first modulation unit 302 modulates the abnormality information received by the reception unit 301 based on the conversion information stored in the modulation information section 342 to indicate an abnormality and generates frequency information including abnormality information indicating the abnormality in a high-frequency band that does not cause flickering to the eyes of people.

Based on the frequency information generated by the first modulation unit 302, the lighting control unit 303 blinks the lighting light source provided in the store to illuminate the store. Specifically, the lighting control unit 303 blinks the LED, which is a lighting light source used as a lighting device, at a high frequency that does not cause flickering to the eyes of people based on the frequency information generated by the first modulation unit 302. Further, the lighting control unit 303 stops blinking at a high frequency based on the abnormality release information received by the reception unit 301.

Figure 6:
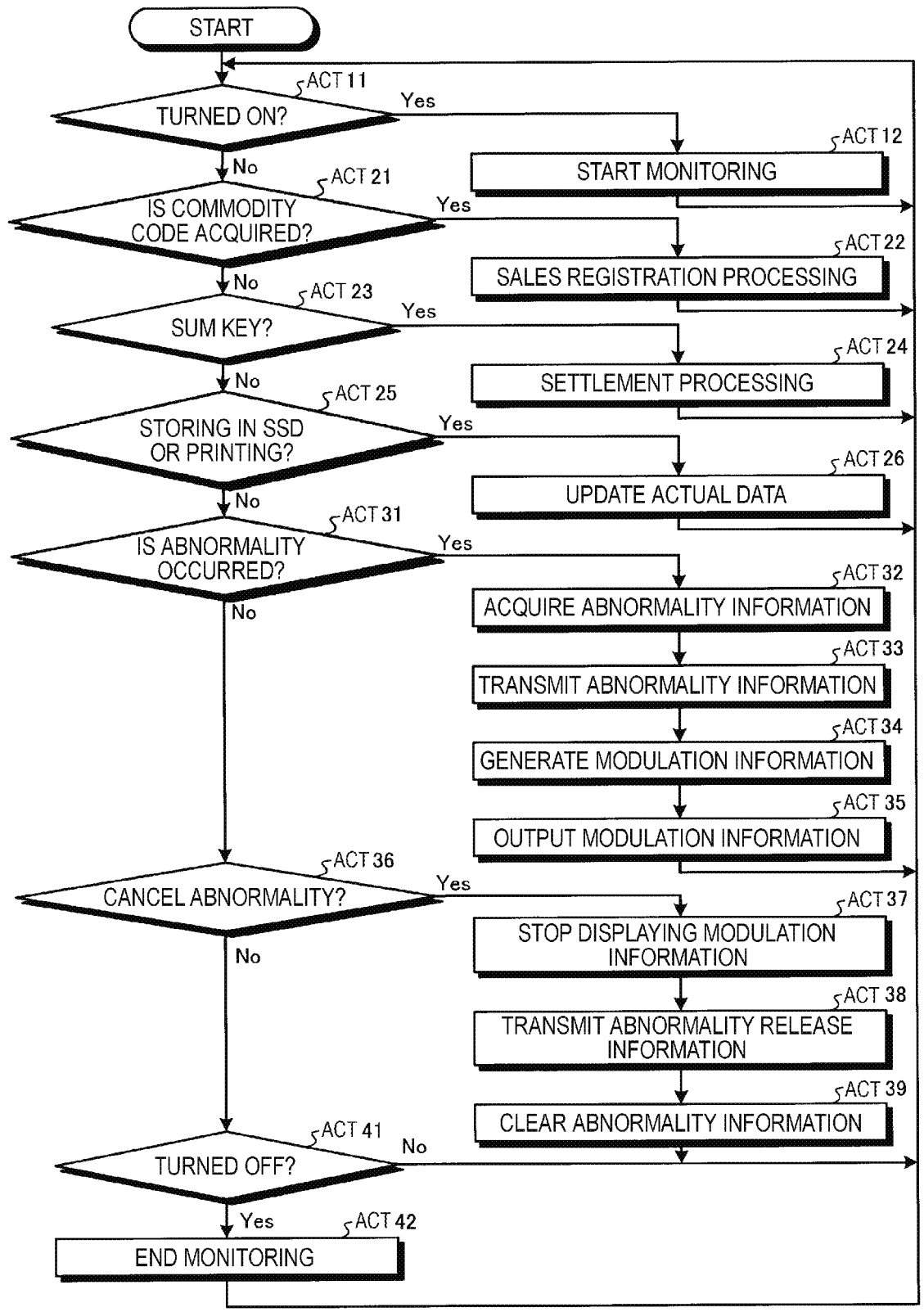
FIG. 6 is a flowchart showing a flow of control processing of the POS terminal.

From here, the control of the POS terminal 1 will be described. FIG. 6 is a flowchart showing a flow of control processing of the POS terminal 1. As shown in FIG. 6, the control unit 100 of the POS terminal 1 determines whether the power of the POS terminal 1 is turned on (ACT 11). If it is determined that the power of the POS terminal 1 is turned on (Yes in ACT 11), the monitoring unit 101 starts monitoring whether there is an abnormality in the own POS terminal 1 (ACT 12). Then, the control unit 100 returns to ACT 11.

If it is determined that the POS terminal 1 is not turned on (No in ACT 11), the control unit 100 determines whether the barcode reader 26 read the symbol attached to the commodity and acquired the commodity code (ACT 21). If it is determined that the commodity code was acquired (Yes in ACT 21), the control unit 100 executes sales registration processing based on the acquired commodity code and stores commodity information in the commodity information section 131 (ACT 22). Then, the control unit 100 returns to ACT 11.

If it is determined that the commodity code is not acquired (No in ACT 21), the control unit 100 determines whether a sum key (not shown) included in the manipulation unit 21 was operated (ACT 23). If it is determined that the sum key was operated (Yes in ACT 23), the control unit 100 executes settlement processing based on the commodity information stored in the commodity information section 131 (ACT 24). Then, the control unit 100 returns to ACT 11.

If it is determined that it is not the operation of the sum key (No in ACT 23), the control unit 100 determines whether information is newly stored in the SDD or printing is newly performed (ACT 25). If it is determined that information is newly stored in the SDD or printing is newly performed (Yes in ACT 25), the control unit 100 updates the actual data stored in the actual data section 1422 to the latest data. Then, the control unit 100 returns to ACT 11.

If it is determined that information is not newly stored in the SDD or printing is not newly performed (No in ACT 25), the control unit 100 determines whether an abnormality occurred in the POS terminal 1 (ACT 31). For example, when the actual data stored in the actual data section 1422 reaches or exceeds the first threshold stored in the first threshold section 1423, the control unit 100 determines that an abnormality occurred in the POS terminal 1. In addition, when the actual data stored in the actual data section 1422 reaches or exceeds the second threshold stored in the second threshold section 1424, the control unit 100 determines that an abnormality occurred in the POS terminal 1.

If it is determined that an abnormality occurred in the POS terminal 1 (Yes in ACT 31), the abnormality information acquisition unit 102 acquires the abnormality information of the abnormal portion and stores the information in the abnormality information section 142 (ACT 32). Next, the abnormality transmission unit 103 transmits the acquired abnormality information to the server 3 (ACT 33). Next, the second modulation unit 104 generates frequency information indicating the abnormality based on the acquired abnormality information (ACT 34). That is, the second modulation unit 104 generates frequency information in a high-frequency band represented by the abnormality information based on the conversion information stored in the modulation information section 143 for the acquired abnormality information (ACT 34). Based on the frequency information generated by the second modulation unit 104, the display control unit 105 displays information while blinking the backlight of the clerk display unit 22 (ACT 35). Then, the control unit 100 returns to ACT 11.

If it is determined that no abnormality occurred in POS terminal 1 (No in ACT 31), the release determination unit 106 determines whether an abnormality was released (ACT 36). In an abnormal state, for example, when the SSD is replaced with a new one, or when the thermal head of the printer 24 is replaced with a new one, the release determination unit 106 determines that the abnormality was released and clears the actual data stored in the actual data section 1422.

If it is determined that the abnormality was released (Yes in ACT 36), the display control unit 105 stops the display processing of blinking the information displayed on the clerk display unit 22 (specifically, the backlight of the clerk display unit 22) performed in ACT 35 (ACT 37). Then, when the abnormality is released, the release transmission unit 107 transmits information on the abnormality release to the server 3 (ACT 38). Then, the control unit 100 clears the abnormality information stored in the abnormality information section 142 and of which abnormality was released (ACT 39). Then, the control unit 100 returns to ACT 11.

In addition, if it is determined that the abnormality is not released (No in ACT 36), the control unit 100 determines whether the power of the POS terminal 1 is turned off (ACT 41). If it is determined that the power of the POS terminal 1 is turned off (Yes in ACT 41), the control unit 100 ends the monitoring started in ACT 12 (ACT 42). Then, the control unit 100 returns to ACT 11. If it is determined that the POS terminal 1 is not turned off (No in ACT 41), the control unit 100 returns to ACT 11.

Figure 7:
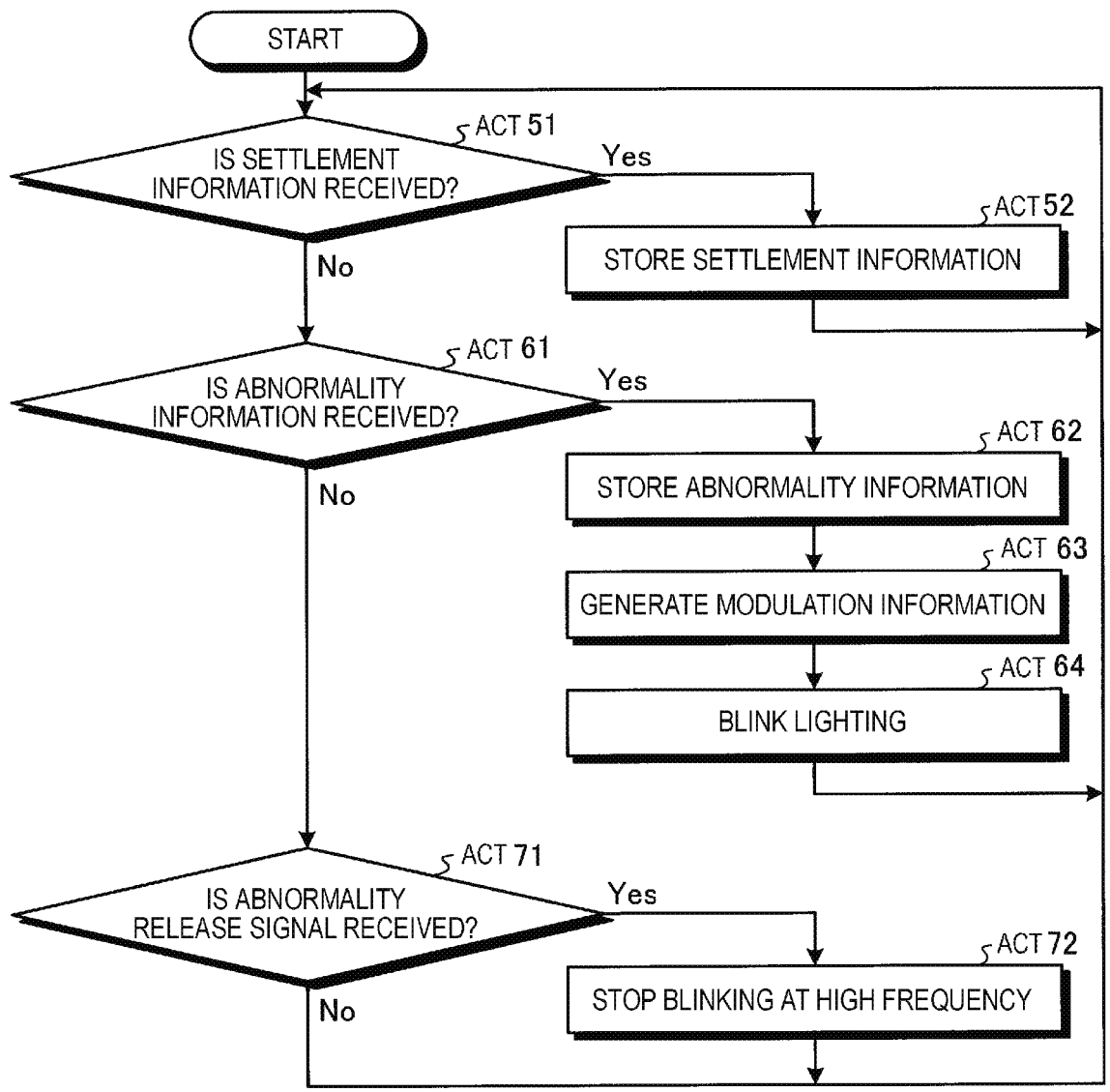
FIG. 7 is a flowchart showing a flow of server control processing.

From here, the control of the server 3 will be described. FIG. 7 is a flowchart showing the flow of control processing of the server 3. As shown in FIG. 7, the control unit 300 of the server 3 determines whether or not commodity information and settlement information related to the sales registration processing of the commodity were received (ACT 51). If it is determined that the commodity information and the settlement information are received (Yes in ACT 51), the control unit 300 accumulates the received commodity information and the settlement information and stores the information in the memory unit 34 and manages the sales information at the store. (ACT 52). Then, the control unit 300 returns to ACT 51.

If it is determined that the commodity information and the settlement information are not received (No in ACT 51), the control unit 300 determines whether the abnormality information is received from the POS terminal 1 (ACT 61). If it is determined that the abnormality information is received from the POS terminal 1 (Yes in ACT 61), the reception unit 301 stores the abnormality information received from the POS terminal 1 in the abnormality information storage unit 331 and accepts the information (ACT 62). Next, the first modulation unit 302 generates frequency information including abnormality information indicating the abnormality in the high-frequency band indicating the abnormality based on the abnormality information received by the reception unit 301 (ACT 63). Then, based on the frequency information generated by the first modulation unit 302, the lighting control unit 303 blinks the LED, which is a lighting light source provided in the store to illuminate the store, at a high frequency that does not cause flickering to the eyes of people (ACT 64). Then, the control unit 300 returns to ACT 51.

In addition, if it is determined that abnormality information is not received from the POS terminal 1 (No in ACT 61), the control unit 300 determines whether abnormality release information was received from the POS terminal 1 (ACT 71). If it is determined that the abnormality release information was received (Yes in ACT 71), the control unit 300 stops the blinking of the LED at a high frequency (ACT 72). Then, the control unit 300 returns to ACT 51. In addition, if it is determined that the abnormality release information is not received (No in ACT 71), the control unit 300 returns to ACT 51.

According to such the first embodiment, in the abnormality monitoring system 9, the POS terminal 1 transmits abnormality information to the server 3, and the server 3 blinks the lighting light source based on the received abnormality information based on the frequency information generated in a high-frequency band. Therefore, the maintenance person who entered the store can obtain the abnormality information of the information processing device without spending time by imaging the lighting light source with the information terminal 7.

Second Embodiment

From here, a second embodiment will be described. In the second embodiment, the same components as those in the first embodiment are denoted by the same reference numerals, and description thereof is omitted.

The second embodiment is characterized in that a camera C that captures the screen of the clerk display unit 22 of the POS terminal 1 is provided. The camera C is configured with, for example, a charge coupled device (CCD) image sensor. The camera C originally images the manipulation unit 21 of the POS terminal 1 and the clerk display unit 22 in order to check the clerk's unauthorized operation at the POS terminal 1. The camera C images the blinking of the screen in the high-frequency band displayed by the display control unit 105 in the processing of ACT 34 as modulation information. Then, the lighting light source is blinked based on the imaged modulation information.

Figure 8:
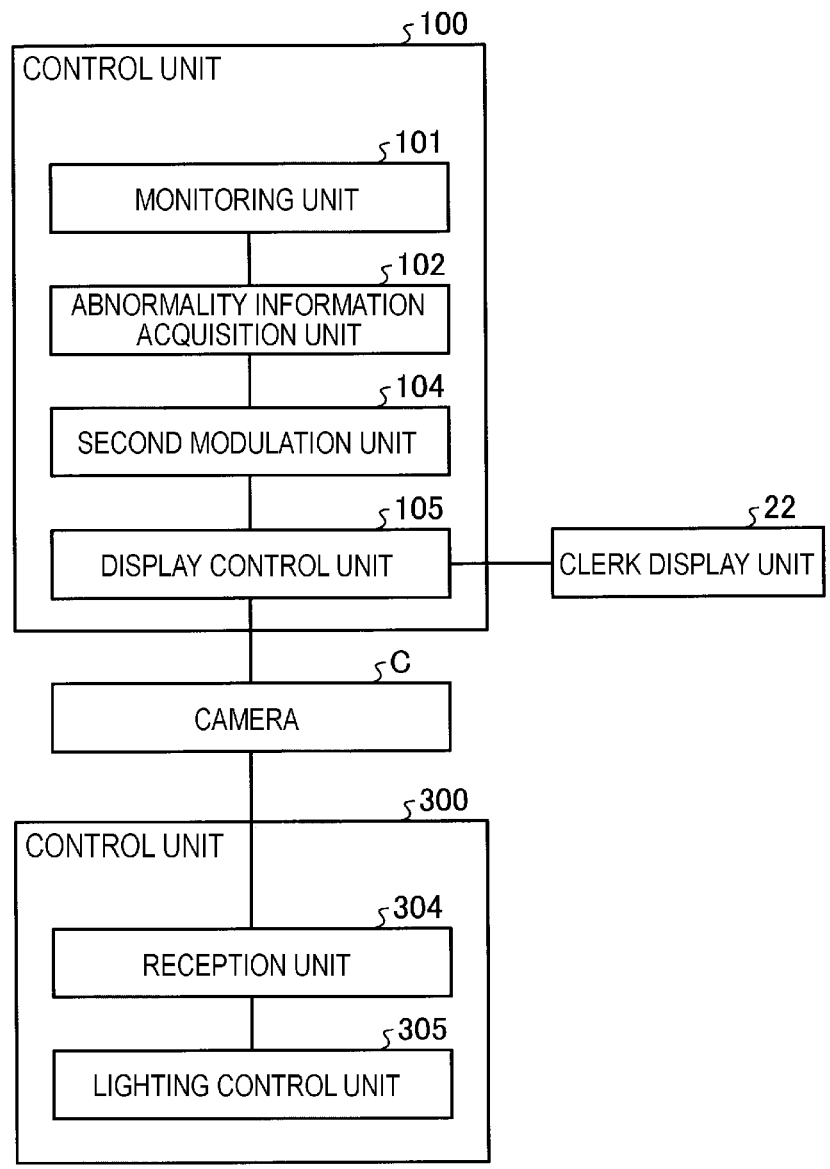
FIG. 8 is a functional block diagram showing a functional configuration of an abnormality monitoring system according to a second embodiment.

First, the functional configuration of the abnormality monitoring system 9 according to the second embodiment will be described. FIG. 8 is a functional block diagram showing a functional configuration of the abnormality monitoring system 9 according to the second embodiment. The POS terminal 1 in the abnormality monitoring system 9 functions as a monitoring unit 101, an abnormality information acquisition unit 102, a second modulation unit 104, and a display control unit 105 by following the control program stored in the control program section 141 and developed in the RAM 13. In addition, the server 3 in the abnormality monitoring system 9 functions as a reception unit 304, and the lighting control unit 305 by following the control program stored in the control program section 341 and developed in the RAM 33.

The reception unit 304 receives the modulation information captured by the camera C. Specifically, the reception unit 304 accepts reception of modulation information captured by the camera C, generated by the second modulation unit 104, and blinked by the display control unit 105.

Based on the modulation information imaged by the camera C, the lighting control unit 305 blinks the lighting light source provided in the store to illuminate the store at a high frequency that does not cause flickering to the eyes of people.

Figure 9:
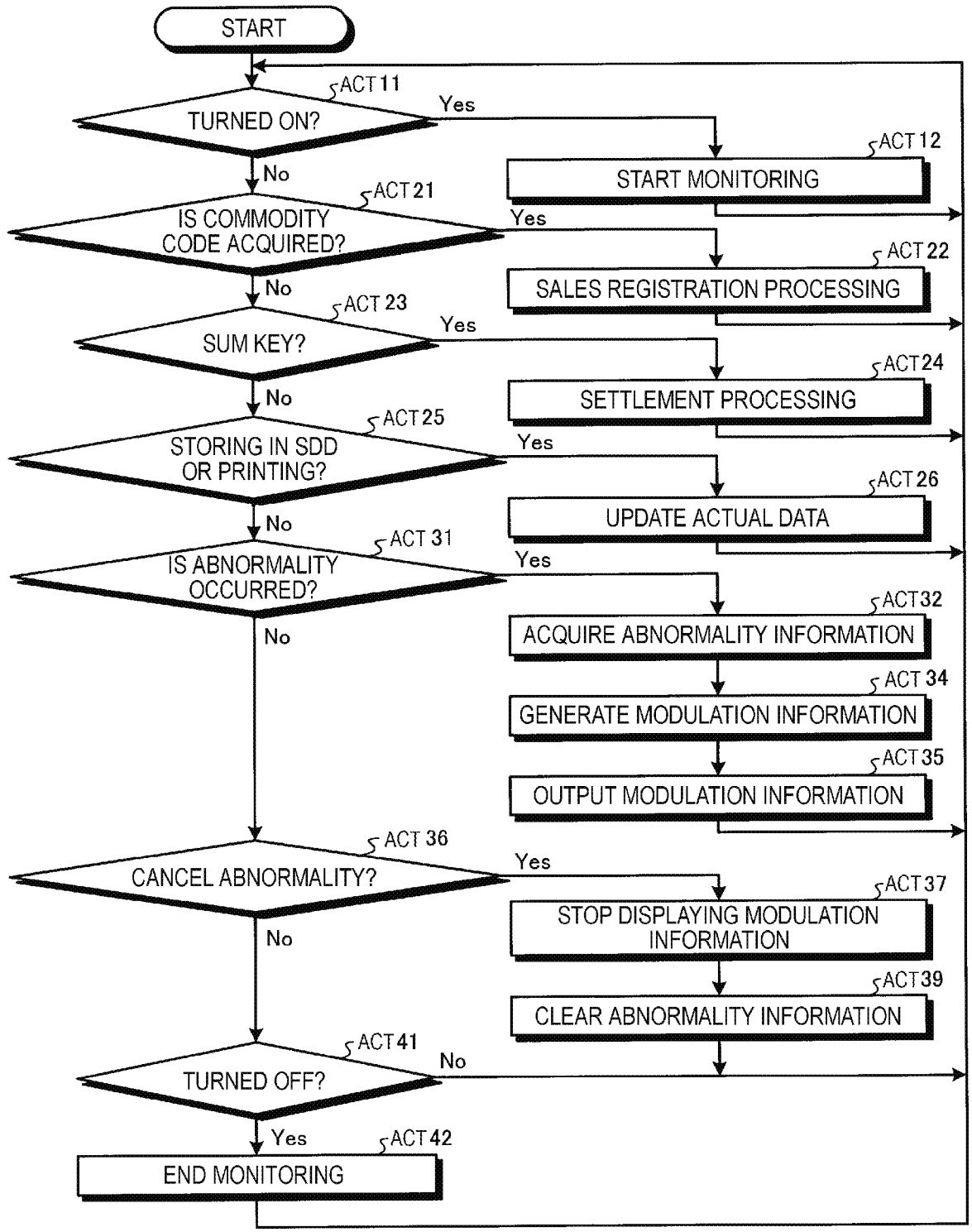
FIG. 9 is a flowchart showing a flow of control processing of the POS terminal.

From here, control of the POS terminal 1 according to the second embodiment will be described. FIG. 9 is a flowchart showing a flow of control processing of the POS terminal 1 according to the second embodiment. As shown in FIG. 9, the POS terminal 1 of the second embodiment does not execute the processings of ACT 33 and ACT 38 in FIG. 6 compared to the POS terminal 1 of the first embodiment. As described above, since the display control unit 105 outputs the information modulated by the second modulation unit 104 and the information is captured by the camera C, there is no need to separately transmit abnormality information from the POS terminal 1 to the server 3. Moreover, since the server 3 receives the modulation information from the POS terminal 1, it is not necessary for the server 3 to modulate the abnormality information and generate frequency information in a high-frequency band.

That is, in the POS terminal 1, the abnormality information acquisition unit 102 acquires the abnormality information of an abnormal portion as a result of monitoring by the monitoring unit 101 and stores the information in the abnormality information section 142 (ACT 32). Next, the second modulation unit 104 generates frequency information in a high-frequency band indicating the abnormality based on the acquired abnormality information. That is, the second modulation unit 104 generates frequency information in a high-frequency band represented by the abnormality information based on the conversion information stored in the modulation information section 143 for the acquired abnormality information (ACT 34). Based on the frequency information generated by the second modulation unit 104, the display control unit 105 blinks and displays information to be displayed on the clerk display unit 22 (specifically, the backlight of the clerk display unit 22). (ACT 35). Then, the control unit 100 returns to ACT 11.

The camera C images the clerk display unit 22 and captures the modulation information in which the backlight displayed in ACT 35 blinks.

Figure 10:
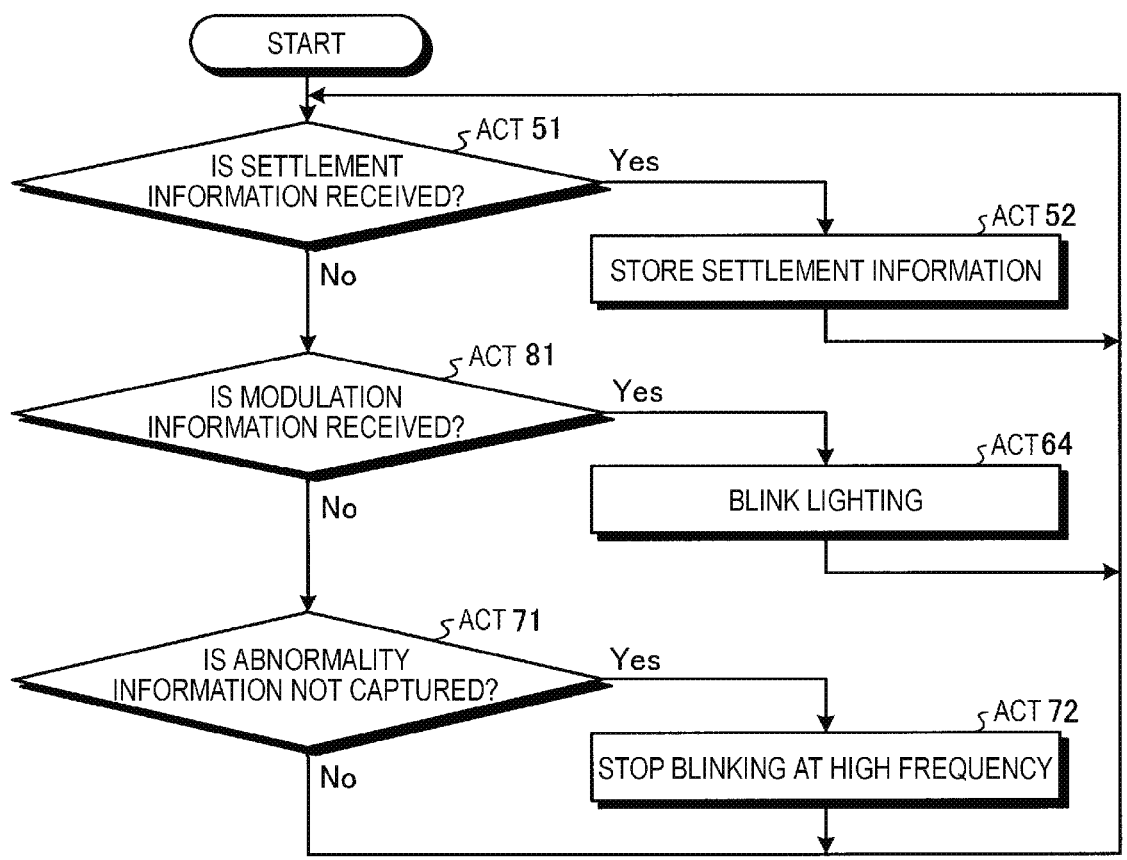
FIG. 10 is a flowchart showing a flow of server control processing.

From here, the control of the server 3 according to the second embodiment will be described. FIG. 10 is a flowchart showing the flow of server control processing. As shown in FIG. 10, the server 3 determines whether the reception unit 304 received modulation information (ACT 81). If the reception unit 304 determines that the modulation information was received (Yes in ACT 81), the lighting control unit 303 causes the LED, which is a lighting light source provided in the store to illuminate the store, to blink at a high frequency that does not cause flickering to the eyes of people (ACT 64), based on the modulation information captured by the camera C. Then, the control unit 300 returns to ACT 51. When the reception unit 304 determines that the modulation information is not received (No in ACT 81), the control unit 300 performs the determination in ACT 71.

According to such the second embodiment, in the abnormality monitoring system 9, the POS terminal 1 modulates the abnormality information and displays the information on the clerk display unit 22, the camera C captures the modulation information displayed, and the server 3 blinks the lighting light source based on the modulation information captured by the camera C. Therefore, the maintenance person who entered the store can obtain the abnormality information of the information processing device without spending time by imaging the lighting light source with the information terminal 7.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, an LED is used as the lighting light source. However, the exemplary embodiment is not limited thereto, and any lighting light source that can be modulated in a high-frequency band that the eyes of people do not feel flickering may be used.

In the embodiment, the backlight of the clerk display unit 22 blinks in a high-frequency band. However, the exemplary embodiment is not limited thereto, and the backlight of the customer display unit 23 may blink at a high frequency.

Further, in the first embodiment, the abnormality information is modulated and displayed on the clerk display unit 22 (second modulation unit 104, display control unit 105). However, the exemplary embodiment is not limited thereto, and in the first embodiment, the second modulation unit 104 and the display control unit 105 are not essential requirements.

In the embodiment, the abnormal state is described as two types of abnormality 142*a* and abnormality 142*b*. However, the exemplary embodiment is not limited thereto, and the abnormal state may be an abnormality other than the abnormality 142*a* and the abnormality 142*b*. Further, the abnormality may be an abnormality related to an error in addition to the abnormality related to the lifetime.

In the embodiment, a description was given by using a plurality of POS terminals 1. However, the exemplary embodiment is not limited thereto, and one or more POS terminals 1 may be used.

In the embodiment, transmission in an abnormal state was described. However, the exemplary embodiment is not limited thereto, and for example, by sending operation log information together with the ID of the device in a normal state, the maintenance person who enters the store can obtain an operation log of the information processing device without spending time by imaging the lighting light source with the information terminal 7.

In the embodiment, lighting and lighting such as backlight are blinked. However, the exemplary embodiment is not limited thereto, and for example, operation log information such as an abnormal state can be directly acquired by modulating the light emission intensity of a power lamp of an individual device such as a printer.

What is claimed is:

1. A monitoring system, comprising:
an information processing device; and
a server, wherein
the information processing device comprises an information transmission component that transmits information related to operation log information to the server when the operation log information of the information processing device is detected, and
the server comprises
a receiver that receives the operation log information transmitted by the information transmission component,
a first operation modulation component that generates frequency information indicating an operation of the information processing device based on the operation log information received by the receiver, and
a lighting control component that blinks a lighting light source provided in a store to illuminate the store based on the frequency information generated by the first operation modulation component,
the information processing device further comprises:
a display that displays information,
wherein the frequency information is first frequency information, and wherein the information processing device further comprises:
a second modulation component that generates second frequency information indicating the operation based on the operation log information, and
a display control component that blinks and displays the display based on the second frequency information generated by the second modulation component.

2. The system according to claim 1, wherein the information processing device and server are connected by a wireless network.

3. The system according to claim 1, wherein the lighting control component causes the lighting light source to blink at a predetermined frequency not based on the frequency information indicating the operation when the operation log information is not received.

4. The system according to claim 1, wherein the operation log information comprises a description of an abnormality of the information processing device or an identity of an abnormality of the information processing device.

5. The system according to claim 1, wherein the operation log information comprises a date and time of an abnormality of the information processing device.

6. The system according to claim 1, wherein the information processing device is a point of sales terminal.

7. The system according to claim 1 comprising a plurality of information processing devices.

8. A monitoring system, comprising:
an information processing device;
a server; and
a camera, wherein
the information processing device further comprises
a display that displays information,
a modulation component that generates frequency information indicating an operation based on operation log information related to the operation when the operation of the information processing device is detected, and
a display control component that blinks and displays the display based on the frequency information generated by the modulation component,
the camera captures modulation information of the display blinked and displayed by the display control component, and
the server comprises a lighting control component that blinks a lighting light source that is provided in a store to illuminate the store, based on the modulation information captured by the camera.

9. The system according to claim 8, wherein the information processing device and server are connected by a wireless network.

10. The system according to claim 8, wherein the lighting control component blinks the lighting light source at a predetermined frequency not based on the frequency information indicating the operation when the camera is not capturing the modulation information.

11. The system according to claim 8, wherein the camera is comprised in a smartphone.

12. The system according to claim 8, wherein the operation log information comprises a description of an abnormality of the information processing device or an identity of an abnormality of the information processing device.

13. The system according to claim 8, wherein the operation log information comprises a date and time of an abnormality of the information processing device.

14. The system according to claim 8, wherein the information processing device is a point of sales terminal.

15. The system according to claim 8 comprising a plurality of information processing devices.

16. A monitoring method, comprising:
transmitting information related to operation log information of an information processing device to a server when the operation log information of the information processing device is detected;
receiving by the server the operation log information transmitted;
generating frequency information indicating an operation of the information processing device based on the operation log information received;
blinking a lighting light source provided in a store to illuminate the store based on the frequency information generated,
displaying information;
wherein the frequency information is first frequency information, generating second frequency information indicating the operation based on the operation log information; and
blinking and displaying the displayed information based on the second frequency information generated.

17. The method according to claim 16, further comprising:
causing the lighting light source to blink at a predetermined frequency not based on the frequency information indicating the operation when the operation log information is not received.

18. The method according to claim 16, wherein the operation log information comprises a date and time of an abnormality of the information processing device.

\* \* \* \* \*